United States Patent
Chang et al.

(10) Patent No.: US 12,444,156 B2
(45) Date of Patent: Oct. 14, 2025

(54) METHOD AND DEVICE FOR DATA MARKING

(71) Applicant: Lenovo (Beijing) Limited, Beijing (CN)

(72) Inventors: Xinfeng Chang, Beijing (CN); Hui Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 431 days.

(21) Appl. No.: 17/940,245

(22) Filed: Sep. 8, 2022

(65) Prior Publication Data

US 2023/0114447 A1 Apr. 13, 2023

(30) Foreign Application Priority Data

Oct. 9, 2021 (CN) .......................... 202111178305.8

(51) Int. Cl.
*G06V 10/24* (2022.01)
*G06V 10/20* (2022.01)

(52) U.S. Cl.
CPC .......... *G06V 10/248* (2022.01); *G06V 10/255* (2022.01); *G06V 2201/07* (2022.01)

(58) Field of Classification Search
CPC .............. G06V 10/248; G06V 10/255; G06V 2201/07; G06V 30/00; G06V 30/10; G06V 30/12; G06V 30/1456; G06V 10/225; G06V 10/235; G06V 30/1444; G06V 20/1448; G06V 10/761; G06V 30/1448; G06V 30/1916; G06V 30/418
See application file for complete search history.

(56) References Cited

U.S. PATENT DOCUMENTS

| | | | | |
|---|---|---|---|---|
| 7,131,061 B2 * | 10/2006 | MacLean | ............. | H04N 1/3873 715/776 |
| 2004/0190772 A1 * | 9/2004 | Constantin | ......... | G06V 30/1444 382/175 |
| 2005/0248808 A1 * | 11/2005 | Ma | ...................... | G06V 30/2455 358/1.15 |
| 2006/0062453 A1 * | 3/2006 | Schacht | ............ | G06V 30/1444 382/164 |
| 2015/0067485 A1 * | 3/2015 | Kim | ...................... | G06F 3/0488 715/256 |
| 2015/0169995 A1 * | 6/2015 | Panferov | .............. | G06V 30/414 382/220 |
| 2017/0315963 A1 * | 11/2017 | Hanatani | .............. | G06V 30/414 |
| 2019/0286899 A1 * | 9/2019 | Wyle | .................... | G06V 30/127 |
| 2020/0302208 A1 * | 9/2020 | Hoehne | .................... | G06N 3/08 |

FOREIGN PATENT DOCUMENTS

CN 111832567 A * 10/2020 ............ G06N 3/045

* cited by examiner

*Primary Examiner* — Sumati Lefkowitz
*Assistant Examiner* — Anna Lei
(74) *Attorney, Agent, or Firm* — ANOVA LAW GROUP, PLLC (57) ABSTRACT

A data marking method includes obtaining a to-be-recognized image that includes to-be-recorded data, the to-be-recorded data being displayed by a display apparatus, recognizing the to-be-recorded data in the to-be-recognized image, detecting the data content displayed by the display apparatus according to the to-be-recorded data, and displaying a marking according to a detection result.

16 Claims, 5 Drawing Sheets

METHOD AND DEVICE FOR DATA MARKING

CROSS-REFERENCE TO RELATED APPLICATION

This application claims priority to Chinese Patent Application No. 202111178305.8, filed on Oct. 9, 2021, the entire content of which is incorporated herein by reference.

TECHNICAL FIELD

The present disclosure relates to the data processing technology field and, more particularly, to a data marking method and a data marking device.

BACKGROUND

A user often copies digital text information from an electronic device such as a computer screen, an iPad screen, or a cellphone to a paper notebook. The digital text information includes text information or numeral information, for example, an identification number, a family address, a work record, a teaching record, etc.

In a copying process, when copying a long paragraph of text, ID number, etc., facing a screen, the user needs to repeatedly confirm the position of the current note recorded. When many words or numbers exist, the user often has problems confirming the specific position where the user copies. Thus, the user can easily copy a wrong line, miss a word, copy a wrong word, or repeat the copying. If the user cannot identify the above problems in time, a final copying result would have an error.

SUMMARY

Embodiments of the present disclosure provide a data marking method. The method includes obtaining a to-be-recognized image that includes to-be-recorded data, the to-be-recorded data being displayed by a display apparatus, recognizing the to-be-recorded data in the to-be-recognized image, detecting the data content displayed by the display apparatus according to the to-be-recorded data, and displaying a marking according to a detection result.

Embodiments of the present disclosure provide a data marking device, including a memory and a processor. The memory stores a computer program. The processor is coupled to the memory and, when the computer program is executed, configured to obtain a to-be-recognized image that includes to-be-recorded data, the to-be-recorded data being displayed by a display apparatus, recognize the to-be-recorded data in the to-be-recognized image, detect the data content displayed by the display apparatus according to the to-be-recorded data, and display a marking according to a detection result.

Embodiments of the present disclosure provide a non-transitory computer-readable storage medium. The storage medium stores a computer program that, when executed by a processor, causes the processor to obtain a to-be-recognized image that includes to-be-recorded data, the to-be-recorded data being displayed by a display apparatus, recognize the to-be-recorded data in the to-be-recognized image, detect the data content displayed by the display apparatus according to the to-be-recorded data, and display a marking according to a detection result.

DETAILED DESCRIPTION OF THE EMBODIMENTS

Exemplary embodiments of the present disclosure are described in detail below in connection with the accompanying drawings. Although the accompanying drawings show exemplary embodiments, the present disclosure may be implemented in various manners and not be limited to the described embodiments. On the contrary, embodiments of the present disclosure are provided for better understanding of the present disclosure and conveying the full scope of the present disclosure to those skilled in the art.

Figure 1:
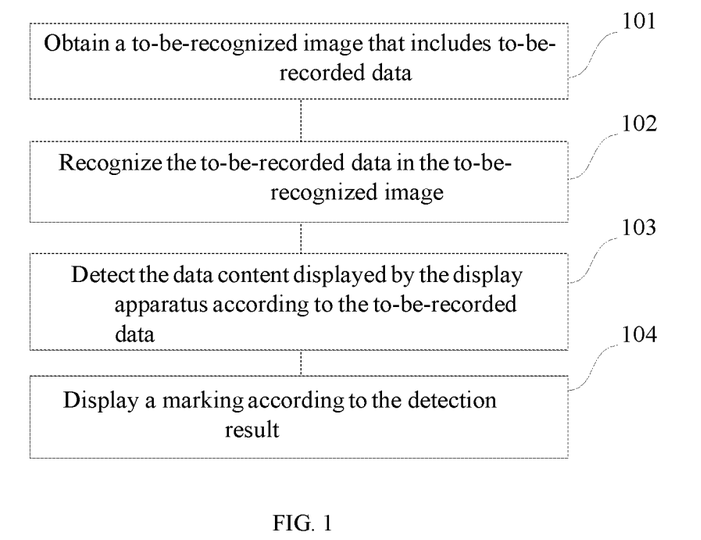
FIG. 1 illustrates a schematic flowchart of a data marking method according to embodiments of the present disclosure.

A user may often manually copy digital text information from an electronic device such as a computer screen, an iPad screen, or a cellphone to a paper notebook or another electronic device. The digital text information may include text information or numeral information, for example, an identification number, a family address, a work record, a teaching record, etc. In an actual copying process, when copying a large paragraph of text, ID number, etc., facing a screen, the user may need to repeatedly confirm where a current note is recorded. When many words or numbers exist, the user usually cannot confirm a specific position where the user copies. Thus, the user can easily copy a wrong line, miss a word, copy a wrong word, or repeat the copying. If the user cannot find out the above problems in time, a final copying result would have an error. Therefore, embodiments of the present disclosure provide a data marking method. The digital text information copied by the user may be marked on a display apparatus in time through the method. Thus, accuracy of the note may be improved. As shown in FIG. 1, the method includes the following processes.

At 101, a to-be-recognized image that includes to-be-recorded data is obtained.

The to-be-recorded data may be from the data content currently displayed by the display apparatus. Before obtaining the to-be-recognized image that includes the to-be-recorded data, the user may turn on the display apparatus. The display apparatus may include an electronic device such as a computer, a cellphone, an iPad, etc. The display apparatus may display the data content. The data content may include text information, digital information, etc. The user may perform copying by referring to the data content on the display apparatus. The copying may include full text copying and partial text copying. The copying manner may include copying by hand on a paper document, recording on an electronic device, etc. Then, an image of the data content, such as text information, digital information, etc., that is copied by the user on the paper document or the electronic device may be obtained through the image collection device. The acquisition method is not limited to camera photographing, screen image interception, etc.

The to-be-recorded data is the data content such as text information, digital information, etc., which would be copied by the user by referring to the data content displayed on the display apparatus. The to-be-recognized image that includes the to-be-recorded data may be an image that includes the data content such as the text information, digital information, etc., copied by the user on the paper document or the electronic apparatus.

At 102, the to-be-recorded data in the to-be-recognized image is recognized.

The to-be-recorded data in the to-be-recognized image may include handwritten font information or standard font. The to-be-recorded data of the handwritten font may be first positioned at each text line on the image that includes the to-be-recorded data of the handwritten font by using a handwritten detection algorithm to obtain the handwritten font information. The standard font may be the to-be-recorded data recorded on the electronic device. For the standard front, a conventional text recognition technique may be used to recognize the standard font, which is not limited by embodiments of the present disclosure. The to-be-recorded data in the to-be-recognized image may be recognized to be matched with the data content of the display apparatus.

At 103, the data content displayed by the display apparatus is detected according to the to-be-recorded data.

The to-be-recorded data recognized in process 102 may be matched with the data content displayed on the display apparatus. The to-be-recorded data may be an entire content of the to-be-recognized image or a newly added data content of the to-be-recognized image compared with the image recognized last time. Therefore, in this process, a data amount of the to-be-recorded data may not be limited to one or a plurality of characters. When the to-be-recorded data includes one character, based on the to-be-recorded data, whether the data content includes a same content as the to-be-recorded data may be determined. When the to-be-recorded data includes a plurality of characters, calculate a similarity between the to-be-recorded data and the data content that has the same character amount. According to the similarity, whether the data content includes the content matching the to-be-recorded data. The determination method of the similarity may not be limited by embodiments of the present disclosure.

A detection process in this process includes performing matching on the to-be-recorded data that is recognized. Thus, a data type of the recognized to-be-recorded data may need to be analyzed first. In some embodiments, the data type is not limited to a text type, a numeric type, a symbol type, etc. Then, according to the data type, a corresponding matching strategy may be selected for the to-be-recorded data. The matching strategy may be a predetermined specific manner used to match the to-be-recorded data with the data content displayed by the display apparatus. Then, data matching may be performed on the to-be-recorded data according to the determined matching strategy.

In some embodiments, when the recognized data is the text information of the text type, the corresponding matching strategy may include performing matching first on same characters. When a character included in the recognized data cannot be matched with the data content of the display apparatus, a semantic analysis may be performed. A result of the semantic analysis may be similar. For example, the display apparatus may display "the weather is sunny," and the content of the recognized data may be "the weather is sunny" due to scribbled handwriting. After the semantic analysis, the content displayed on the display apparatus and the content of the recognized data may have a similar semantic. Thus, the content of the copied data may be determined to be "the weather is sunny." Therefore, "the weather is sunny" may be marked on the electronic device.

In some embodiments, when the recognized data is the digital information of the digital type, the corresponding matching strategy may include performing matching on same numbers. If a number of recognized numbers is less than a number of numbers on the display apparatus, a semantic analysis may be performed on the text in front of the numbers on the display apparatus. A result of the semantic analysis may be a number group related to identification or positioning, such as an ID number, a cellphone number, a house number, etc. For example, the display apparatus may display "ID number of John is 1234567891098765," due to the scribbled handwriting, the recognized content may be "R34567891098765." Key information "ID number" may be obtained by performing the semantic analysis on the text information "ID number of John is" in front of the numbers. Thus, a number at the beginning of the number group may be determined to not be an uppercase letter, and the copied data content may be determined to be "1234567891098765." Therefore, "1234567891098765" may be marked on the display apparatus.

In some embodiments, when the recognized data is the symbol information of the symbol type, such as a comma, a period, a bracket, etc., matching may be performed on the same symbol. In some embodiments, if a single number 0 or 9 is recognized between the texts, a semantic analysis may be performed on the texts in front of or after the number. A result of the semantic analysis may be a related semantic including the number, e.g., 0 gram, 9 vehicles, etc. Thus, the single number may be determined to be a number. If the result of the semantic analysis does not include the related semantic including the number, the period or the comma may be determined to be written as the number 0 or 9 due to scribbled handwriting. Then, the number 0 or 9 may be determined to be the period or the comma.

At 104, a marking is displayed according to the detection result.

The detection result may include detecting the same to-be-recorded data and not detecting the same to-be-recorded data. If the same to-be-recorded data is detected, the marking may be displayed. If the same to-be-recorded data is not detected, process 101 may continue to be executed. A marking method may include but is not limited to, prompting through highlighting for display, underlining, and letting the cursor stay at a currently written character, etc., which are not limited by the present disclosure.

Figure 5:
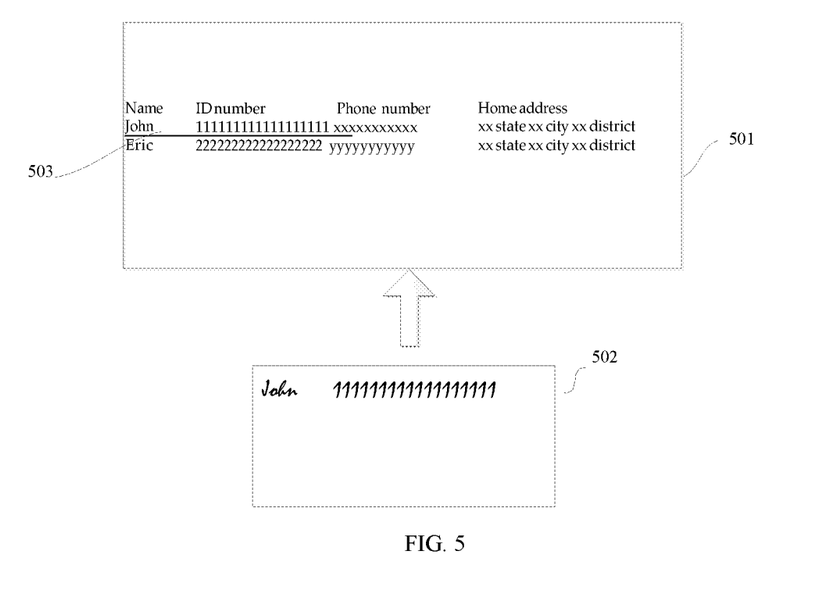
FIG. 5 illustrates a schematic diagram of a data marking method according to embodiments of the present disclosure.

Embodiments of the present disclosure are described in connection with specific application scenarios. As shown in FIG. 5, in an office scenario, an office worker needs to copy the name, ID number, cellphone number, and home address displayed on the computer screen 501 to the paper notebook 502. In embodiments of the present disclosure, an image of the paper notebook 502 may be obtained, and the name and ID number (i.e., John 111111111111111111) in the image may be recognized. The recognized content "John 1111111111111111111" may be matched with the information of the name, the ID number, the cellphone number, and the home address on the computer screen 501. "John 1111111111111111111" may be matched on the computer screen 501. Then, "John 111111111111111111" on the computer screen 501 may be marked by a mark 503. The mark 503 may not be limited to underlining, text highlighting, text bolding, etc.

Figure 6:
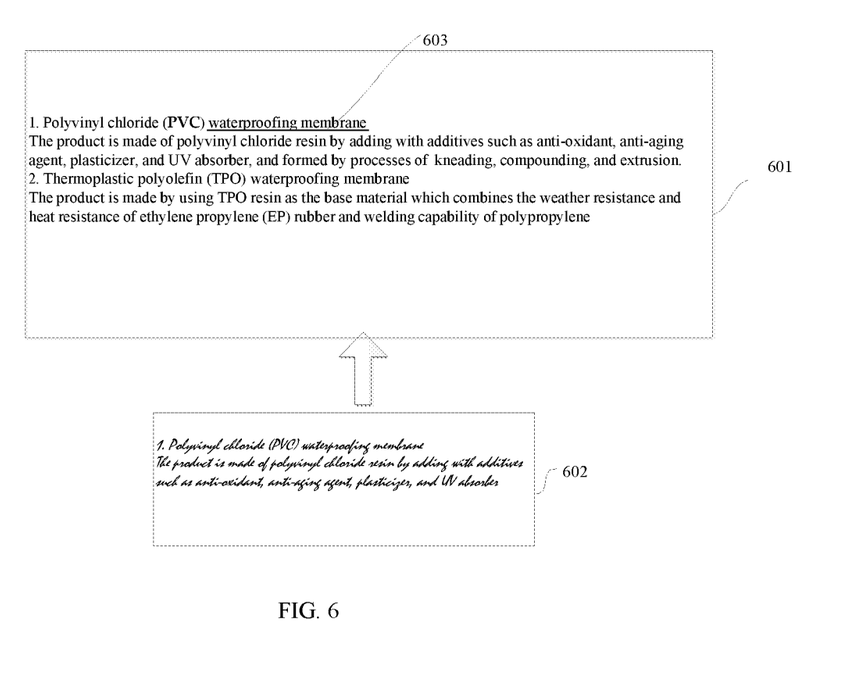
FIG. 6 illustrates a schematic diagram of another data marking method according to embodiments of the present disclosure.

As shown in FIG. 6, in a learning scenario, a student needs to partially copy an image on the cellphone or a learning content on a word document on a workbook. The learning content on the computer screen 601 may be partially copied on the paper notebook 602. In embodiments of the present disclosure, the image of the paper notebook 602 may be obtained. The copied content of the image (i.e., 1. Polyvinyl chloride (PVC) waterproofing membrane product is made of polyvinyl chloride resin by adding with additives such as anti-oxidant, anti-aging agent, plasticizer, and UV absorber) may be recognized. The copied content that is recognized may be matched with the information on the computer screen 601. The copied content may be matched on the computer screen 601, and "1. Polyvinyl chloride (PVC) waterproofing membrane product is made of polyvinyl chloride resin by adding with additives such as anti-oxidant, anti-aging agent, plasticizer, and UV absorber" on the computer screen 601 may be underlined by the mark 603. The mark 603 may include underlining, text highlighting, text bolding, etc., which are not limited by the present disclosure.

Based on embodiments shown in FIG. 1, the present disclosure provides a data marking method. In the actual copying process, the user needs to repeatedly confirm where the current note is recorded when copying information of a large paragraph of text facing the screen and identification number. Further, when many characters or numbers need to be copied, the user often cannot determine where the note is recorded. In the present disclosure, the method may include obtaining the to-be-recognized image that includes the to-be-recorded data, recognizing the to-be-recorded data in the to-be-recognized image, performing matching on the recognized to-be-recorded data and the data content on the display apparatus to obtain a match result, that is a detection result, and displaying the marking according to the detected result. Thus, the problem of wrong line copying, character missing copying, wrong character copying, and repeated copying due to the position where the note is recorded cannot be determined by the user may be avoided. Data content of a part that is copied may be automatically marked on the display apparatus. The user may be reminded of the position where the note is recorded in time to improve the accuracy of the note.

Figure 2:
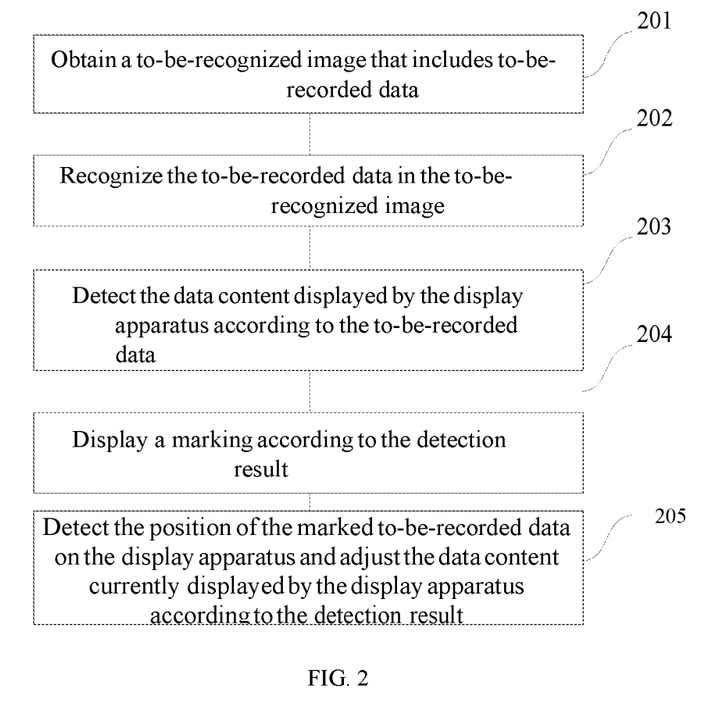
FIG. 2 illustrates a schematic diagram showing another data marking method according to embodiments of the present disclosure.

Further, based on embodiments shown in FIG. 1, embodiments of the present disclosure also provide another data marking method. As shown in FIG. 2, the method includes the following processes.

At 201, the to-be-recognized image that includes the to-be-recorded data is obtained.

The process may be described in connection with the description of process 101. The same content is not repeated.

In the method, a camera may be configured to obtain the to-be-recognized image. The camera may be arranged on an upper end of an electronic device such as a computer, a cellphone, an iPad, etc., or a camera configured at an individual camera device that is connected through a special-purpose bracket. The bracket may be configured to rotate and adjust a photographing angle of the camera. The camera may face the front of the user. The lens may slightly face downward. Thus, a photographing range of the lens may cover a tool carrier used by the user for copying. The tool carrier may include a paper carrier and an electronic device carrier. The to-be-recognized image captured by the camera may include a target object. The target object may include one or more of recorded data, a writing tool, and a human body feature. The writer tool may include at least a pen, a notebook, etc. The human body feature may include, but is not limited to, an arm, a hand, a finger, etc. The target object must contain to-be-recorded data.

The to-be-recognized image may be detected based on the target object. The target object may at least include the to-be-recorded data. The photographing angle of the camera may be adjusted according to the detection result to obtain the to-be-recognized image that includes the to-be-recorded data. An installation method of the camera and an adjustment method of the photographing angle is not limited by the present disclosure.

At 202, the to-be-recorded data in the to-be-recognized image is recognized.

This process may be described in connection with the description of process 102. The same content is not repeated here.

At 203, the data content displayed by the display apparatus is detected according to the to-be-recorded data.

This process may be described in connection with the description of process 103. The same content is not repeated here.

At 204, a marking is displayed according to the detection result.

This process may be described in connection with the description of process 104. The same content is not repeated here. If the same to-be-recorded data is detected to be located in a plurality of positions in the display apparatus at the same time, the data at the plurality of positions may be marked first. The user may select the to-be-recorded data at a determined position. According to the to-be-recorded data at the determined position selected by the user, displaying the marking of the to-be-recorded data at other positions may be canceled. When the position selected by the user is at a lower position of the display apparatus, to facilitate the user to watch, a display position of the marked to-be-recorded data may be adjusted. Thus, the to-be-recorded data may be in the middle position of the display interface of the display device.

Figure 7:
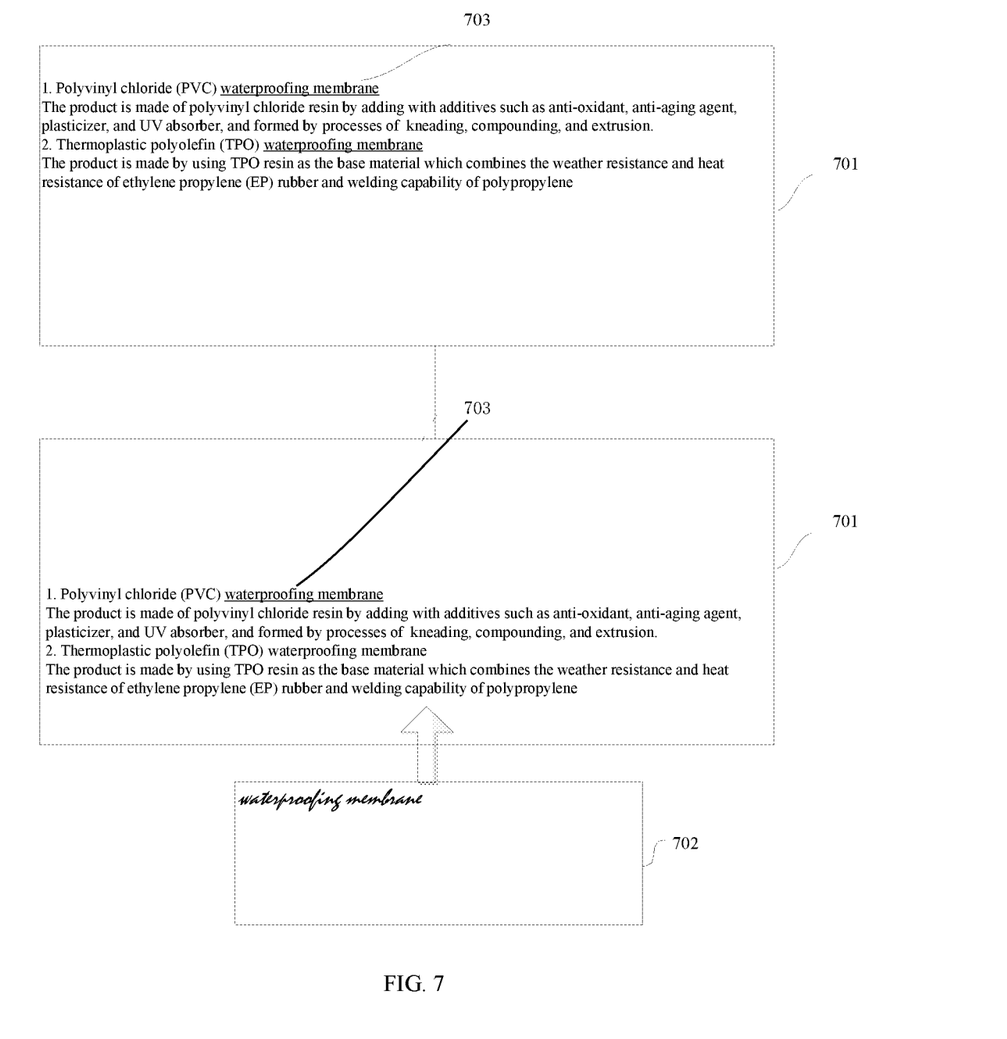
FIG. 7 illustrates a schematic diagram of another data marking method according to embodiments of the present disclosure.

As shown in FIG. 7, in the learning scenario, a student needs to copy a part of the learning content in the image of the cellphone or the word in the notebook. The user may need to copy the learning content on the computer display 701 in the paper notebook 702. In embodiments of the present disclosure, the image of the paper notebook 702 may be obtained. The copied content (i.e., a Waterproof Membrane) in the image may be recognized. The recognized "Waterproof Membrane" may be matched with the information on the computer screen. "Waterproof Membrane" at two positions may be matched on the computer screen 701. The "Waterproof Membrane" may be marked by the mark 703. The student may click at a tail of the "Waterproof Membrane" that is actually copied for positioning. Meanwhile, the marks of the other "Waterproof Membrane" may be canceled. The mark 703 may include underlining, text highlighting, text bolding, etc., which are not limited by the present disclosure.

In the embodiments of the present disclosure, first the marking may be displayed on the to-be-recorded data that is not detected according to the detection result, and a second marking may be displayed on the to-be-recorded data that is detected. A differential marking and comparison may be performed on the to-be-recorded data that is not detected and the to-be-recorded data that is detected, which facilitates the user to discover an overall situation of the note recorded by the user. If the user performs partial copying, the user may know a ratio of the partial copying of the user, which can avoid a situation where wrong character copying, character missing copying, and wrong line copying cannot be discovered in time.

Figure 8:
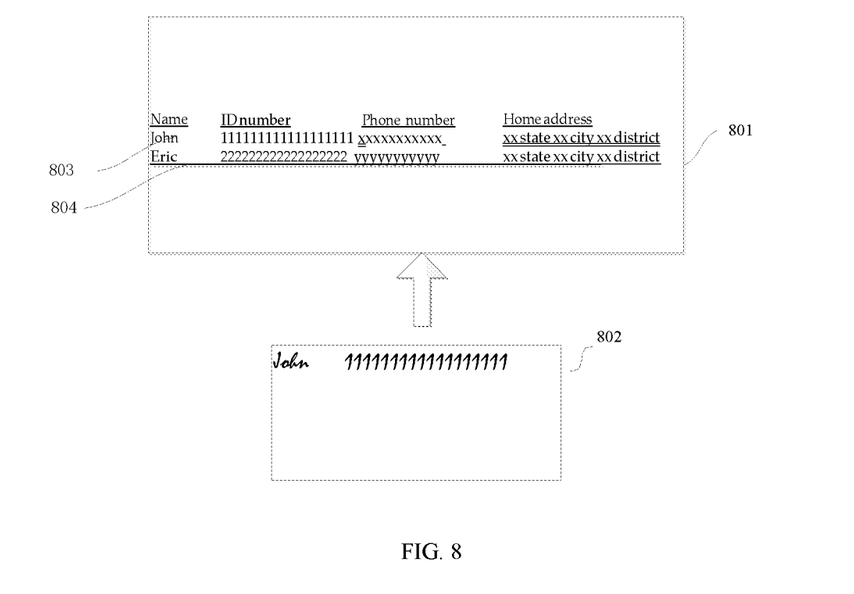
FIG. 8 illustrates a schematic diagram of another data marking method according to embodiments of the present disclosure.

As shown in FIG. 8, in the office scenario, the office staff needs to copy the name, the ID number, the cellphone number, and the home address on the computer screen 801 into the paper notebook 802. In embodiments of the present disclosure, by obtaining the image of the paper notebook 802 and recognizing the name and ID number in the image (i.e., John 111111111111111111), the recognized "John 111111111111111111" may be matched with the information on the computer screen 801, such as the name, the ID number, the cellphone number, and the home address, etc. "John 111111111111111111" may be matched on the computer screen 801. "John 111111111111111111" on the computer screen may be marked by the second mark 803 in a bolded manner. The other data information may be marked by a first mark 804 in an underlining manner. on the top is marked in bold with the second mark 803, and the rest of the data information The first mark 804 is underlined, and the marks 803 and 804 may be underlined, highlighted in yellow, bolded, etc. The mark 803 and the mark 804 may include underlining, text highlighting, text bolding, etc., the mark 803 and the mark 804 may be different, which are not limited by the present disclosure.

In embodiments of the present disclosure, alarm information may also be issued according to a position distribution result of the first mark display and the second mark display to prompt the user to check the to-be-recorded data. The content marked by the first mark may be the to-be-recorded data that is not detected on the display apparatus. The content marked by the second mark may be the to-be-recorded data that is detected on the display apparatus. Each row of the data may be marked on the display apparatus. A mark result of each row may include that all data in the row is marked by the first mark and displayed (first type), all data in the row is marked by the second mark and displayed (second type), and a part of the data in the row is marked by the first mark and displayed, and the other data may be marked by the second mark and displayed (third type).

The distribution result may be the third type of the mark result for each row (that is, a part of the data in the row is marked by the first mark and displayed, and the other data may be marked by the second mark and displayed) that appears continuously. When a number of rows exceed a predetermined number of rows, the alarm information may be issued. Otherwise, no alarm information may be issued. The predetermined number of rows is not limited by the present disclosure and may be determined as needed. The alarm information may include sound information, prompt box information, etc., which is not limited by the present disclosure.

Figure 9:
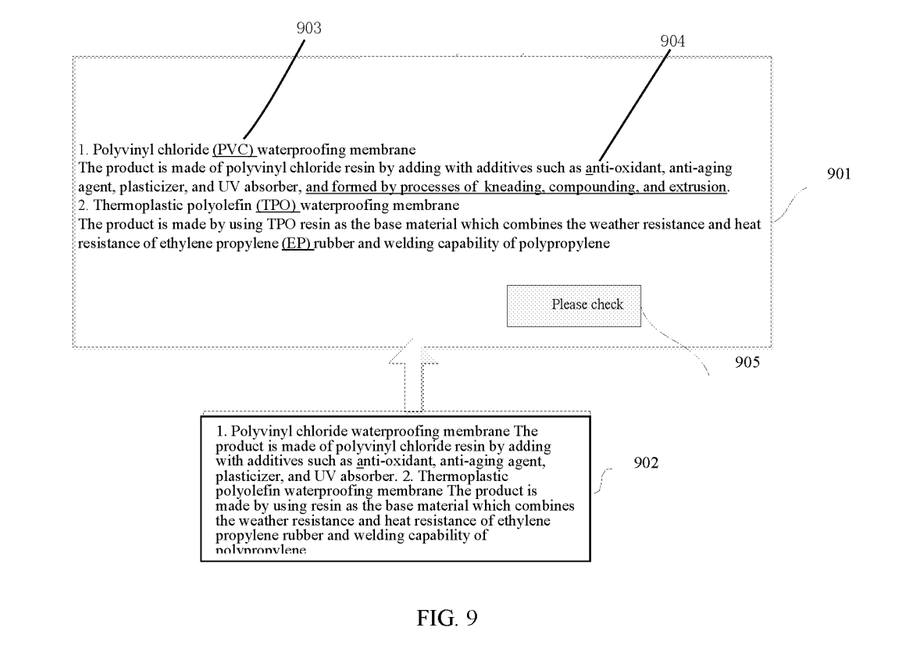
FIG. 9 illustrates a schematic diagram of another data marking method according to embodiments of the present disclosure.

As shown in FIG. 9, when the student performs partial copying on each row of a first row to a fifth row of the computer screen 901, the characters of each row of the first row to the fifth row copied by the user are marked (i.e., "1. Polyvinyl chloride waterproof membrane" in the first row, "The product is made of polyvinyl chloride resin by adding with additive with anti-oxidant, anti-aging" in the second row, "agent, plasticizer, and UV absorber" in the third row, "thermoplastic Polyolefin (TPO) waterproof membrane" in the fourth row, "the product is made by using TPO resin as the base material which combines the weather resistance and heat resistance of ethylene propylene rubber and welding capability of polypropylene" in the fifth row) with the second mark 903 in a bolding manner, and the rest characters are marked with the first mark 904 in an underlining manner. Then, a reminder message 905 may be issued. The reminding method may be a prompt window message to prompt the user to check the data content 902 that has been copied. Thus, the user may review and check the overall copying situation in time to avoid missing words. The mark 903 and the mark 904 may include underlining, text highlighting, text bolding, etc., the mark 903 and the mark 904 may be different, which are not limited by the present disclosure.

Further, in some other embodiments of the present disclosure, the second marking may be displayed on subsequent data content neighboring to the marked to-be-recorded data according to a continuous length of the marked to-be-recorded data. Thus, when the user performs copying on a large piece of continuous text, the data content that is not copied may be better highlighted to facilitate copying.

At 205, the position of the marked to-be-recorded data is detected on the display apparatus, and the data content currently displayed by the display apparatus is adjusted according to the detection result.

Before the position of the marked to-be-recorded data is detected on the display apparatus, a predetermined position of the to-be-recorded data may be arranged on the display apparatus. Then, whether the marked to-be-recorded data is located at the predetermined position on the display apparatus may be detected. If the marked to-be-recorded data is located at the predetermined position, the data content currently displayed by the display apparatus may be updated.

The predetermined position may be the position of the data of the last row on the display apparatus where the to-be-recorded data is located, which is not limited by the present disclosure. A manner of updating the data content that is currently displayed on the display apparatus may not be limited to page turning, scrolling up, etc., which is not limited by embodiments of the present disclosure.

According to FIG. 2, the present disclosure provides the data marking method. When the copied content is marked on the screen, the content copied by the user is few, and the copied content is a common word with high frequency, an accurate position where the user copies cannot be marked. Thus, by marking the same contents at the plurality of positions simultaneously and combining with manual content selection, the accurate position where the user copies may be determined. In the process of copying by the user, if the copied content is much and distributed, word missing may occur after the user performs copying for a while. Therefore, in the present disclosure, the part that is copied by the user and the part that is not copied by the user may be displayed in different marking manners. The user may be prompted according to the distribution of the first mark and the second mark of each row in the plurality of continuous rows. Thus, the user may review and check the overall copying situation in time to avoid word missing and improve the accuracy of the note. In the present disclosure, the position of the marked content may be adjusted on the screen to make the user comfortably refer. The data content may be automatically adjusted on the screen to avoid manual page turning to improve user convenience.

Figure 3:
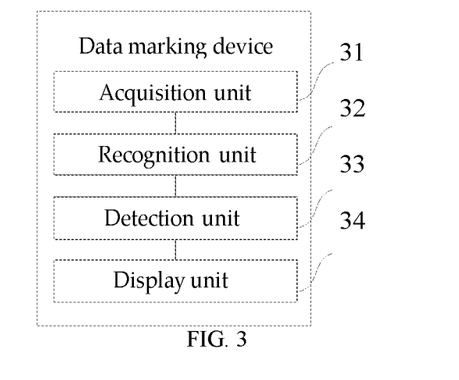
FIG. 3 illustrates a schematic block diagram of a data marking device according to embodiments of the present disclosure.

Further, as an implementation of the method shown in FIG. 1 above, embodiments of the present disclosure further provide a data marking device, which is configured to implement the method shown in FIG. 1. Device embodiments may correspond to method embodiments. To facilitate reading, the detailed content of method embodiments is not repeated in embodiments of the present disclosure. However, device embodiments may correspond to all method embodiments of the present disclosure. As shown in FIG. 3, the device includes an acquisition unit 31, a recognition unit 32, a detection unit 33, and a display unit 34.

The acquisition unit 31 may be configured to obtain the to-be-recognized image of the to-be-recorded data. The to-be-recorded data may include data content that is currently displayed on the display apparatus.

The recognition unit 32 may be configured to recognize the to-be-recorded data of the to-be-recognized image obtained by the acquisition unit 31.

The detection unit 33 may be configured to detect the data content displayed by the display apparatus according to the to-be-recorded data recognized by the recognition unit 32.

The display unit 34 may be configured to display the detection result obtained by the detection unit 33.

Figure 4:
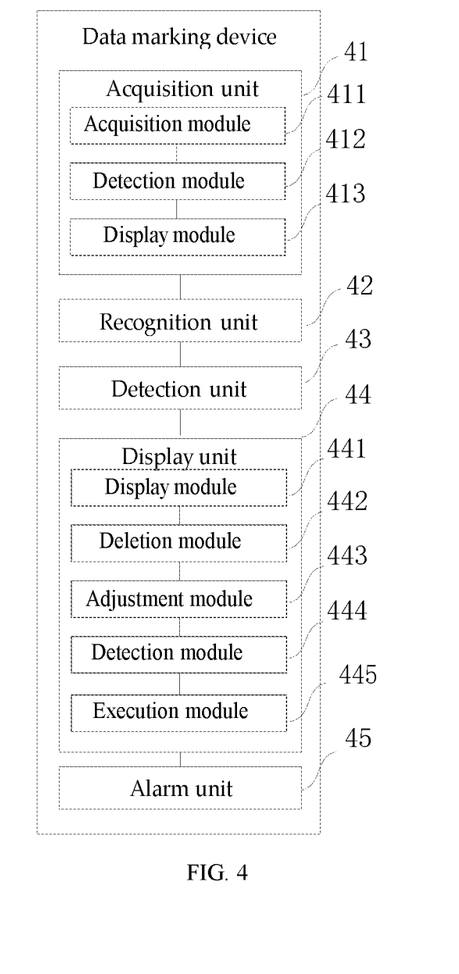
FIG. 4 illustrates a schematic block diagram of another data marking device according to embodiments of the present disclosure.

Further, to implement the method shown in FIG. 2, embodiments of the present disclosure further provide another data marking device, which is configured to implement the method shown in FIG. 2. Device embodiments may correspond to method embodiments. To facilitate reading, the detailed content of method embodiments is not repeated in embodiments of the present disclosure. However, device embodiments may correspond to all method embodiments of the present disclosure. As shown in FIG. 4, the device includes an acquisition unit 41, a recognition unit 42, a detection unit 43, a display unit 44, and an alarm unit 45.

The acquisition unit 41 may be configured to obtain the to-be-recognized image of the to-be-recorded data. The to-be-recorded data may include data content that is currently displayed on the display apparatus.

The recognition unit 32 may be configured to recognize the to-be-recorded data of the to-be-recognized image obtained by the acquisition unit 41.

The detection unit 43 may be configured to detect the data content displayed by the display apparatus according to the to-be-recorded data recognized by the recognition unit 42.

The display unit 44 may be configured to display the detection result obtained by the detection unit 43.

The alarm unit 45 may be configured to issue alarm information according to a position distribution result of the first marking and displaying and the second marking and displaying obtained by the display unit 44 to prompt the user to check the copied data.

Further, the display unit 44 further includes a display module 441 and a deletion module 442. The display module 441 may be configured to display a marking on the to-be-recorded data existing in the plurality of positions on the display apparatus according to the detection result. The deletion module 442 may be configured to cancel displaying the marking of to-be-recorded data in other positions according to the to-be-recorded data of the specified position selected by the user obtained by the display module 441.

Further, the display unit 44 further includes an adjustment module 443. The adjustment module may be configured to adjust the display position of the marked to-be-recorded data obtained by the display module 441 to cause the to-be-recorded data to be located in a middle position of the interface displayed by the display apparatus.

Further, the acquisition unit 41 includes an acquisition module 441, a detection module 412, and an adjustment module 413.

The acquisition module 411 may be configured to obtain the to-be-recognized image captured by the camera.

The detection module 412 may be configured to detect the to-be-recognized image obtained by the acquisition module 411 according to a target object. The target object may include at least the to-be-recorded data.

The adjustment module 413 may be configured to adjust the photographing angle of the camera according to the detection result obtained by the detection module 412 to obtain the to-be-recognized image including the to-be-recorded data.

Further, the display unit 44 includes a detection module 444 and an execution module 445.

The detection module 444 may be configured to detect the position of the marked to-be-recorded data on the display apparatus.

The execution module 445 may be configured to adjust the data content currently displayed by the display apparatus according to the detection result obtained by the detection module 444.

Further, the display unit 44 may be further configured to display the first marking on the to-be-recorded data that is not detected according to the detection result obtained by the detection unit 43 and display the second marking on the to-be-recorded data that is detected.

Further, embodiments of the present disclosure further provide a processor. The processor may be configured to run a program to perform the data marking methods described above.

Further, embodiments of the present disclosure further provide a storage medium. The storage medium is used to store a computer program that, when the computer program is executed, controls the device where the storage medium is located to perform the data marking methods above.

In embodiments of the present disclosure, embodiments are described with emphasis. For parts that are not described in detail in a certain embodiment, reference may be made to related descriptions of other embodiments.

The relevant features in the methods and devices may refer to each other. In addition, "first," "second," etc., in embodiments are used to distinguish embodiments and do not represent advantages and disadvantages of embodiments.

Those skilled in the art can understand that, for the convenience and brevity of description, the specific operation process of the system, device, and unit described above may refer to the corresponding process in method embodiments, which is not repeated here.

The algorithms and displays provided herein are not inherently related to any particular computer, virtual system, or another device. Various general-purpose systems can also be used with teaching based on this. According to the description, the structure required to construct such a system is obvious. Furthermore, the present disclosure is not for any particular programming language. Various programming languages may be used to implement the content of the present disclosure. The description of the specific language above is intended to disclose some embodiments of the present disclosure.

In addition, the memory may include a non-persistent memory, a random access memory (RAM), and/or a non-volatile memory of the computer-readable media, such as a read-only memory (ROM) or a flash memory (flash RAM). The memory may include at least one memory chip.

Those skilled in the art should understand that embodiments of the present disclosure may be provided as methods, systems, or computer program products. Therefore, the present disclosure may be implemented in a hardware-only embodiment, a software-only embodiment, or a hardware and software combined embodiment. Furthermore, the present disclosure may adopt a computer program product that can be implemented in one or more computer-readable storage media (i.e., including but not limited to, magnetic disk, CD-ROM, optical storage, etc.).

The present disclosure is described with reference to a flowchart and/or a block diagram of the methods, devices (systems), and computer program products according to embodiments of the present disclosure. The computer program instruction may be used to realize each process and/or block in the flowchart and/or block diagram, and a combination of the process and/or the block in the flowchart and/or the block diagram. These computer program instructions may be provided to a processor of a general purpose computer, a special purpose computer, an embedded processor, or another programmable data processing device to produce a machine. Thus, the instructions may be executed by the processor of the computer or the other programmable data processing device to produce a device, which can be configured to implement the function specified by one process or more processes of the flowchart and/or one block or more blocks of the block diagram.

These computer program instructions may also be stored in a computer-readable memory capable of directing the computer or the other programmable data processing device to operate in a particular manner to cause the instruction stored in the computer-readable memory to produce a manufactured product including the instruction device. The instruction device may be configured to realize the function specified by the one process or more processes of the flowchart and/or the one block or more blocks of the block diagram.

These computer program instructions can also be loaded on the computer or the other programmable data processing device to cause a series of operational steps to be performed on the computer or the other programmable device to produce the computer-implemented processes. Thus, the instructions that are performed on the computer or the other programmable device may provide steps of realizing the one process or more processes of the flowchart and/or the one block or more blocks of the block diagram.

In a configuration, the computing device may include one or more processors (CPUs), input/output interfaces, network interfaces, and memory.

The memory may include non-persistent memory, random access memory (RAM), and/or non-volatile memory in the computer-readable medium, such as read-only memory (ROM) or flash memory (RAM). The memory may be an example of the computer-readable medium.

The computer-readable medium may include permanent, non-permanent, removable, and non-removable media, which can use any method or technology to store information. The information may include a computer-readable instruction, a data structure, a program module, or other data. An example of the computer storage medium may include, but is not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, optical disk read-only memory (CD-ROM), digital versatile disc (DVD), or another optical storage, a magnetic tape cassette, a magnetic tape magnetic disk storage, another magnetic storage device, or any other non-transmission medium that can be used to store information and can be accessed by the computer device. As defined herein, the computer-readable medium may not include computer-readable transitory media, such as a modulated data signal and a carrier wave.

The term "comprising," "including," or any other variation thereof are intended to encompass a non-exclusive inclusion such that a process, method, article, or device comprising a series of elements includes not only those elements, but also other elements not expressly listed or inherent to such a process, method, article, of device are also included. Without more restriction, an element defined by the phrase "comprising a . . . ," does not preclude the presence of additional identical elements in the process, method, article, or device in which the element is included.

Those skilled in the art should understand that embodiments of the present disclosure may be provided as a method, a system, or a computer program product. Thus, the present disclosure may employ entirely hardware embodiments, entirely software embodiments, or a combination of software and hardware embodiments. Furthermore, the present disclosure may adopt a computer program product that can be implemented in one or more computer-readable storage media (i.e., including but not limited to, magnetic disk, CD-ROM, optical storage, etc.).

The above are only embodiments of the present disclosure and are not used to limit the present disclosure. For those skilled in the art, various modifications and variations may be made to the present disclosure. Any modifications and equivalent replacements made within the spirit and principle of the present disclosure should be within the scope of the appended claims of the present disclosure.

What is claimed is:

1. A data marking method comprising:
    obtaining a to-be-recognized image that includes an at least partial manual copy of to-be-recorded data, the to-be-recorded data being associated with data content displayed by a display apparatus, the at least partial manual copy being produced by a user writing by hand;
    recognizing the to-be-recorded data in the to-be-recognized image, the recognizing the to-be-recorded data comprising performing a handwriting recognition procedure on the to-be-recognized image;
    detecting the data content displayed by the display apparatus according to the to-be-recorded data;
    displaying a marking according to a detection result;
    displaying a first marking on to-be-recorded data that is not detected according to the detection result;
    displaying a second marking on to-be-recorded data that is detected;
    determining a quantity of continuous lines of data in the to-be-recorded data where the first marking and the second marking are both displayed in every line of data; and
    issuing an alarm message to prompt the user to check data that is copied in response to the quantity exceeding a predetermined quantity.

2. The method of claim 1, wherein displaying the marking according to the detection result includes:
    displaying markings on the to-be-recorded data at a plurality of positions on the display apparatus according to the detection result; and
    canceling markings in the to-be-recorded data at positions other than a selected position in the to-be-recorded data.

3. The method of claim 2, further comprising:
adjusting a display position of the marked to-be-recorded data to cause the marked to-be-recorded data to be located in a middle position of an interface displayed by the display apparatus.

4. The method of claim 1, wherein obtaining the to-be-recognized image that includes the at least partial manual copy of the to-be-recorded data includes:
obtaining a first to-be-recognized image captured by a camera;
detecting the first to-be-recognized image according to a target object, the target object at least including the to-be-recorded data; and
adjusting a photographing angle of the camera according to a first detection result to obtain the to-be-recognized image that includes the at least partial manual copy of the to-be-recorded data.

5. The method of claim 1, further comprising:
detecting a position of marked to-be-recorded data on the display apparatus; and
adjusting the to-be-recorded data currently displayed by the display apparatus according to the detection result.

6. The method of claim 1, further comprising:
displaying a second marking on subsequent data content neighboring to marked to-be-recorded data according to a continuous length of the marked to-be-recorded data.

7. A data marking device comprising:
a memory storing a computer program; and
a processor coupled to the memory and, when the computer program is executed, configured to:
obtain a to-be-recognized image that includes an at least partial manual copy of to-be-recorded data, the to-be-recorded data being associated with data content displayed by a display apparatus, the at least partial manual copy being produced by a user writing by hand;
recognize the to-be-recorded data in the to-be-recognized image, the recognizing the to-be-recorded data comprising performing a handwriting recognition procedure on the to-be-recognized image;
detect the data content displayed by the display apparatus according to the to-be-recorded data;
display a marking according to a detection result;
display a first marking on to-be-recorded data that is not detected according to the detection result;
display a second marking on to-be-recorded data that is detected;
determine a quantity of continuous lines of data in the to-be-recorded data where the first marking and the second marking are both displayed in every line of data; and
issue an alarm message to prompt the user to check data that is copied in response to the quantity exceeding a predetermined quantity.

8. The device of claim 7, wherein the processor is further configured to:
display markings on the to-be-recorded data at a plurality of positions on the display apparatus according to the detection result; and
cancel markings in the to-be-recorded data at positions other than a selected position in the to-be-recorded data.

9. The device of claim 8, wherein the processor is further configured to:
adjust a display position of the marked to-be-recorded data to cause the marked to-be-recorded data to be located in a middle position of an interface displayed by the display apparatus.

10. The device of claim 7, wherein the processor is further configured to:
obtain a first to-be-recognized image captured by a camera;
detect the first to-be-recognized image according to a target object, the target object at least including the to-be-recorded data; and
adjust a photographing angle of the camera according to a first detection result to obtain the to-be-recognized image that includes the at least partial manual copy of the to-be-recorded data.

11. The device of claim 7, wherein the processor is further configured to:
detect a position of marked to-be-recorded data on the display apparatus; and
adjust the to-be-recorded data currently displayed by the display apparatus according to the detection result.

12. The device of claim 7, wherein the processor is further configured to:
display a second marking on subsequent data content neighboring to marked to-be-recorded data according to a continuous length of the marked to-be-recorded data.

13. A non-transitory computer-readable storage medium storing a computer program that, when executed by a processor, causes the processor to:
obtain a to-be-recognized image that includes an at least partial manual copy of to-be-recorded data, the to-be-recorded data being associated with data content displayed by a display apparatus, the at least partial manual copy being produced by a user writing by hand;
recognize the to-be-recorded data in the to-be-recognized image, the recognizing the to-be-recorded data comprising performing a handwriting recognition procedure on the to-be-recognized image;
detect the data content displayed by the display apparatus according to the to-be-recorded data;
display a marking according to a detection result;
display a first marking on to-be-recorded data that is not detected according to the detection result;
display a second marking on to-be-recorded data that is detected;
determine a quantity of continuous lines of data in the to-be-recorded data where the first marking and the second marking are both displayed in every line of data; and
issue an alarm message to prompt the user to check data that is copied in response to the quantity exceeding a predetermined quantity.

14. The storage medium of claim 13, wherein the processor is further configured to:
displaying markings on the to-be-recorded data at a plurality of positions on the display apparatus according to the detection result; and
cancel markings in the to-be-recorded data at positions other than a selected position in the to-be-recorded data.

15. The storage medium of claim 14, wherein the processor is further configured to:
adjust a display position of the marked to-be-recorded data to cause the marked to-be-recorded data to be located in a middle position of an interface displayed by the display apparatus.

16. The storage medium of claim 13, wherein the processor is further configured to:
   obtain a first to-be-recognized image captured by a camera;
   detect the first to-be-recognized image according to a target object, the target object at least including the to-be-recorded data; and
   adjust a photographing angle of the camera according to a first detection result to obtain the to-be-recognized image that includes the at least partial manual copy of the to-be-recorded data.

* * * * *